United States Patent
Norton et al.

(10) Patent No.: US 8,476,187 B2
(45) Date of Patent: Jul. 2, 2013

(54) PROCESS FOR PREPARING CATALYST POWDER

(75) Inventors: Daniel George Norton, Niskayuna, NY (US); Larry Neil Lewis, Scotia, NY (US); Elliott West Shanklin, Altamont, NY (US); Frederic Joseph Klug, Schenectady, NY (US); Venkat Subramaniam Venkataramani, Clifton Park, NY (US); Robert Joseph Lyons, Burnt Hills, NY (US); Dan Hancu, Clifton Park, NY (US); Benjamin Hale Winkler, Albany, NY (US); Hrishikesh Keshavan, Clifton Park, NY (US)

(73) Assignee: General Electric Company, Schenectady, NY (US)

(*) Notice: Subject to any disclaimer, the term of this patent is extended or adjusted under 35 U.S.C. 154(b) by 323 days.

(21) Appl. No.: 12/652,808

(22) Filed: Jan. 6, 2010

(65) Prior Publication Data

US 2011/0166015 A1     Jul. 7, 2011

(51) Int. Cl.
*B01J 23/48* (2006.01)
(52) U.S. Cl.
USPC ............ 502/347; 502/60; 502/350; 502/349; 502/351; 502/180
(58) Field of Classification Search
None
See application file for complete search history.

(56) References Cited

U.S. PATENT DOCUMENTS

| | | | |
|---|---|---|---|
| 5,622,684 A | 4/1997 | Pinnavaia et al. | |
| 5,785,946 A | 7/1998 | Pinnavaia et al. | |
| 5,795,559 A | 8/1998 | Pinnavaia et al. | |
| 5,840,264 A | 11/1998 | Pinnavaia et al. | |
| 6,027,706 A | 2/2000 | Pinnavaia et al. | |
| 6,702,993 B2 | 3/2004 | Pinnavaia et al. | |
| 6,746,659 B2 | 6/2004 | Pinnavaia et al. | |
| 6,869,906 B2 | 3/2005 | Pinnavaia et al. | |
| 2005/0288179 A1* | 12/2005 | Park et al. | 502/159 |
| 2006/0166809 A1 | 7/2006 | Malek et al. | |
| 2007/0092421 A1* | 4/2007 | Hancu et al. | 423/239.1 |
| 2009/0074641 A1* | 3/2009 | Lewis et al. | 423/213.2 |

FOREIGN PATENT DOCUMENTS

| | | |
|---|---|---|
| WO | 9815500 A1 | 4/1998 |
| WO | 2009068117 A1 | 6/2009 |

OTHER PUBLICATIONS

K Takagi, T. Kobayashi, H. Ohkita, T. Mizushima, N. Kakuta, A Abe, K Yoshida; Selective reduction of NO on Ag/Al2O3 catalysts prepared from boehmite needles; Catalysis Today 45 (1998) 123±127.

Larry Neil Lewis et al. ; Title of docket : Templated Catalyst Composition and Associated Method; U.S. Appl. No. 12/362,520, filed Jan. 30, 2009.

(Continued)

*Primary Examiner* — Melvin C Mayes
*Assistant Examiner* — Smita Patel
(74) *Attorney, Agent, or Firm* — Jean K Testa

(57) ABSTRACT

The present invention details a process for producing a catalyst powder. The steps of the process include preparing catalyst slurry, drying, pyrolyzing, and calcining the catalyst slurry to obtain a calcined catalyst powder. The catalyst slurry comprises a catalyst, a liquid carrier, a templating agent, and a catalyst substrate. The catalyst slurry is dried to obtain a raw catalyst powder. The raw catalyst powder is heated in a first controlled atmosphere to obtain a pyrolyzed catalyst powder and the pyrolyzed catalyst powder is calcined in a second controlled atmosphere to obtain a calcined catalyst powder. A method of fabricating a catalyst surface and catalytic converter using the prepared catalyst powder is also illustrated.

24 Claims, 6 Drawing Sheets

OTHER PUBLICATIONS

Ming Yin et al.; Title of docket : Templated Catalyst Composition and Associated Method; U.S. Appl. No. 12/362,533, filed on Jan 30, 2009.

Larry Neil Lewis et al.; Title of docket : Catalyst and Method of Manufacture; U.S. Appl. No. 12/550,970 filed on Aug. 31, 2009.

* cited by examiner

PROCESS FOR PREPARING CATALYST POWDER

BACKGROUND

The invention relates generally to a process for making a catalyst and particularly to a process for preparing a catalyst powder and using the catalyst powder in a catalytic convertor.

In selective catalytic reduction (SCR), nitrogen oxide (NOx) reduction can be accomplished with either ammonia or urea, co-fed into the exhaust as these gases pass over a solid catalyst. High NOx reduction conversion has been reported for both ammonia and urea-SCR. However, both the ammonia and urea reduction approaches require infrastructure to supply reductants, and where ammonia is used it may slip past the catalyst, resulting in unacceptable ammonia emissions. Another technology is hydrocarbon (HC) SCR wherein hydrocarbon serves as the reductant for NOx conversion. Hydrocarbons employed for HC-SCR include relatively small molecules like methane, ethane, ethylene, propane and propylene as well as linear hydrocarbons like hexane, octane, etc.

The injection of diesel or methanol has been explored in some of the heavy-duty diesel engines to supplement the HC in the exhaust stream. From an infrastructure point of view, it would be advantageous to employ an on-board diesel fuel as the hydrocarbon source for HC-SCR. SCR using diesel injection may include catalytic metals disposed upon a porous substrate. The preparation and deposition of the catalytic metals on such substrates are typically involved and complex. The structure and/or efficacy of the catalyst substrate is at times compromised during this process, resulting in the catalyst not functioning properly and leading to a reduction in the conversion efficiency of the catalyst.

Therefore, it is desirable to have a method of preparing and processing catalysts that do not compromise the catalyst activity during NOx reduction. It is further desirable to have a process that is amenable for a large-scale production of the catalysts and employing them in the catalytic converters.

BRIEF DESCRIPTION

One embodiment of the present invention is a process for producing a catalyst powder. The steps of the process include preparing a catalyst slurry, and drying, pyrolyzing, and calcining the catalyst slurry to obtain a calcined catalyst powder. The catalyst slurry comprises a catalyst, a liquid carrier, a templating agent, and a catalyst substrate. The catalyst slurry is dried to obtain a raw catalyst powder. The raw catalyst powder is heated in a first controlled atmosphere to obtain a pyrolyzed catalyst powder and the pyrolyzed catalyst powder is calcined in a second controlled atmosphere to obtain a calcined catalyst powder.

Another embodiment of the present invention is a process for producing a catalyst powder. The steps of the process include preparing a catalyst slurry, and drying, pyrolyzing, and calcining the catalyst slurry to obtain a calcined catalyst powder. The catalyst slurry comprises a catalyst, a liquid carrier, a templating agent, and a catalyst substrate. The catalyst slurry is dried to obtain a raw catalyst powder. The raw catalyst powder is heated in a first controlled atmosphere to obtain a pyrolyzed catalyst powder and the pyrolyzed catalyst powder is calcined in a second controlled atmosphere to obtain a calcined catalyst powder. A catalytic surface comprising the calcined catalyst powder is fabricated.

Another embodiment of the present invention is a process for producing a NOx catalytic convertor. The steps of the process include preparing a catalyst slurry, spray drying the catalyst slurry, pyrolyzing, and calcining the catalyst slurry to obtain a calcined catalyst powder. The catalyst slurry comprises silver, alumina, an alcohol, and a templating agent. The catalyst slurry is spray dried to obtain a raw catalyst powder. The raw catalyst powder is heated in an inert atmosphere to obtain a pyrolyzed catalyst powder and the pyrolyzed catalyst powder is calcined in a controlled oxygen atmosphere to obtain a calcined catalyst powder comprising silver-templated mesoporous alumina (Ag-TA). The calcined catalyst powder is mixed with a liquid to form a calcined catalyst powder slurry and washcoated onto a monolith support.

DETAILED DESCRIPTION

Figure 1:
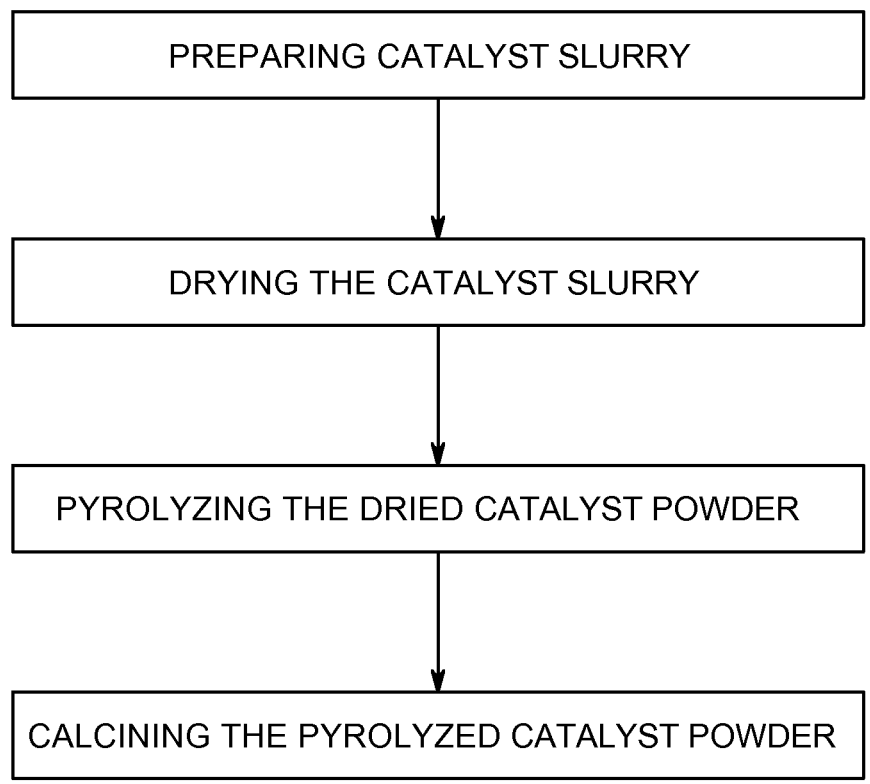
FIG. 1 is a process map of preparing a catalytic powder in accordance with one embodiment of the invention.

The methods described herein include embodiments that relate to a method of producing catalyst powder, and a method of using the catalyst powder in the formation of making a catalytic convertor. The catalyst powder is processed in a manner that reduces the catalyst powder particle size without any excessive milling and without substantially reducing, degrading or altering its catalytic activity. The method for producing the catalyst powder may scalable to produce commercially viable quantities of the powder. Generally disclosed is a NOx reduction catalyst and NOx reduction system for reducing NOx in exhaust gas discharged from a combustion device. Suitable combustion devices may include furnaces, ovens, or engines, such as internal combustion engines and gas turbine engines.

In the following specification and the claims that follow, the singular forms "a", "an" and "the" include plural referents unless the context clearly dictates otherwise.

As used herein, without further qualifiers, "mesoporous" refers to a material containing pores with diameters in a range of from about 2 nanometers to about 50 nanometers. A catalyst is a substance that can cause a change in the rate of a chemical reaction without itself being consumed in the reaction. A slurry is a mixture of a liquid and finely divided particles. A sol is a colloidal solution. A powder is a substance including finely divided solid particles. Templating refers to a controlled patterning; and, "templated" refers to determined control of an imposed pattern and may include molecular self-assembly. A monolith may be a ceramic block having a number of channels, and may be made by extrusion of, for instance, clay, binders and additives that are pushed through a die to create a structure. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value, or to commonly accepted levels of process variation. Similarly, "free" may be used in combination with a term, and may include an insubstantial number, or trace amounts, while still being considered free of the modified term. "Large-scale" as used herein means a batch size more than about 2 kilograms of powder.

Large-scale synthesis of NOx catalyst powders and use of the prepared catalyst powders in making a catalytic convertor in a large engine present multiple challenges. Typically, the quantities of catalyst powders prepared in a laboratory processes are only a few grams while the testing and usage in large engines require at least a few kilograms of catalyst powders. In the laboratory synthetic process, a slurry can be quickly filtered and dried in simple steps while the extremely slow filtration step is difficult to accomplish and time consuming on a large-scale. The pyrolysis and calcination of the dried catalyst powders can be carried out in a single batch in small ovens and furnaces for working on the laboratory scale, while tested and qualified efficient thermal treatment processes are required for a large-scale catalyst powder pyrolysis and calcination. The calcined catalyst powders need to be further subjected to a well-structured process and be incorporated into the fabrication of large-scale catalytic converters. The different embodiments of the present invention provide steps of processing a large batch of catalyst powders while maintaining reactivity characteristics of the catalyst powders.

For the ease of description, the process of catalyst powder preparation is described herein throughout the specification with the example of silver and templated mesoporous alumina (Ag-TA) with the use of isopropyl alcohol and TRITON-X114™ surfactant. However, the application is in no way limited in scope to the use of only these materials in the production of catalyst powders.

A process for preparing the catalyst powder, according to one embodiment, is illustrated in the process map of FIG. 1. The process includes preparing a catalyst slurry, drying the catalyst slurry, pyrolizing the dried catalyst powder and then calcining the pyrolyzed catalyst powder to obtain a final, calcined catalyst powder. The catalyst slurry includes a catalyst substrate, a liquid carrier, a templating agent, and a catalyst.

Suitable materials for catalyst substrate may include ceramic materials. In one embodiment, the catalyst substrate includes oxide materials. In one embodiment, the catalyst substrate includes alumina, zirconia, silica, zeolite, or any mixtures comprising these elements. The desired properties of the catalyst substrate include, for example a relatively small particle size and high surface area. In one embodiment, the powder of the catalyst substrate has an average diameter that is less than about 100 micrometers. In one embodiment, the average diameter is less than about 100 micrometers. In a further embodiment, the average diameter is from about 1 micrometer to about 10 micrometers. The catalyst substrate powders may have a surface area greater than about 100 $m^2$/gram. In one embodiment, the surface area of the catalyst substrate powder is greater than about 200 $m^2$/gram. In one embodiment, the surface area is in a range of from about 200 $m^2$/gram to about 500 $m^2$/gram, and, in another embodiment, from about 300 $m^2$/gram to about 600 $m^2$/gram.

Suitable liquid carriers include water and short chain alcohols. Suitable short chain alcohols include one or more of methanol, ethanol, hexanol, isopropanol (IPA), 1-butanol, 2-butanol, iso-butanol, t-butanol, and the like. In one embodiment, the liquid carrier is water. In another embodiment, the liquid carrier is IPA.

Templating agents facilitate the production of catalyst substrates containing directionally aligned forms. The catalyst slurry generally contains a templating agent in an amount of about 0.1 to about 10 wt %, based upon the weight of the catalyst slurry. In one embodiment, the catalyst slurry comprises templating agent in a range from about 3 to about 7 wt %. An exemplary templating agent is octylphenol ethoxylate, commercially available as TRITON X-114®.

Suitable catalysts include one or more of gallium, indium, rhodium, palladium, ruthenium, and iridium. Other suitable catalysts include transition metal elements. Suitable catalysts also include one or more of platinum, gold and silver. In one particular embodiment, the catalyst is substantially 100% silver.

According to one embodiment, a typical process in a large-scale preparation of Ag-TA catalyst powder starts with the addition of liquid carrier with ethylacetoacetate in a reactor and stirring the contents. A proportional amount of an organic compound of the intended catalyst substrate can be added to the initial contents in a reactor along with varying amounts of templating agents and catalyst compounds.

The reactor can be heated at reflux for a fixed time duration. After refluxing, a suspension of particles in the liquid carrier will be obtained. In one embodiment, this suspension is considered as a catalyst slurry. Depending on the initial liquid carrier used, this slurry can be aqueous or non-aqueous. In one embodiment, wherein the non-aqueous slurry is present, but it is desirable to use an aqueous slurry for the further processing steps, the suspension in the reactor can be formed as an azeotropic mixture by a slow addition of water. The system can then be heated to remove some of the non-aqueous liquids through distillation, thereby producing aqueous based catalyst slurry.

With regard to drying the catalyst slurry to form a powder, the slurry may be dried in a manner that controls and reduces the particle size of the catalyst substrate sufficiently for further use. In addition, a drying technique may preserve or maintain the pore structure of the catalyst substrate and the efficacy of the catalyst. The preserved pore structure of the catalyst substrate may be a mesoporous or microporous structure. In one embodiment, the pore structure is templated or controlled to have a defined pattern, size/volume, and distribution.

In one embodiment, spray-drying is used to generate dried catalyst powders from the catalyst slurry. Spray drying can be used to dry aqueous or alcoholic slurries or suspensions. As disclosed earlier, in one embodiment, water may be added to the slurry in an amount necessary to remove all of the non-aqueous liquid in the slurry and to obtain a final aqueous suspension of particles in water with a targeted desired percentage of solids. This final aqueous catalyst slurry is used for spray drying in one embodiment. In another embodiment a non-aqueous liquid is directly used for spray drying. In a further exemplary embodiment, a catalyst slurry comprising alcohol as the carrier is used for spray drying.

In one embodiment, the catalyst slurry is spray dried to generate a dried catalyst powder with a particle size sufficiently small to be used to form catalyst powders. The spray drying can produce particles with a $D_{90} \leqq 50$ microns (90% of the particles have a diameter 14 microns). In one embodiment, the particles produced by spray drying have $D_{90} \leqq 14$ microns. By varying the slurry composition and the spray drying parameters, it is possible to obtain particles with a $D_{90}$ as low as 3 microns.

The dried catalyst powder contains absorbed water, TRITON X-114, as well as some hydrocarbons from the slurry synthesis step. All of these extraneous materials are generally substantially removed from the powder prior to use. This process is hereon denoted as "de-tritonization" or pyrolysis. A simple heat treatment in air for de-tritonization may be undesirable for several reasons. For example, rapid combustion of the TRITON X-114 and/or hydrocarbons may cause hot spots on the catalyst, resulting in catalyst deactivation. Therefore, it is desirable to heat-treat the dried catalyst powders in a controlled atmosphere.

An atmosphere as used herein is an ambience surrounding and contacting the powders. In one embodiment, a controlled atmosphere can be a first controlled atmosphere wherein the oxygen content is controlled such that the first controlled atmosphere is inert with respect to the materials being processed. As used herein, "inert" means no significant chemical reaction between the materials being processed and the atmosphere occurs during processing. The content of oxygen in this first controlled atmosphere is less than about 0.5 mol %. The first controlled atmosphere can also be a vacuum. The vacuum is herein defined as an atmosphere wherein a total pressure is less than about 20 torr. In one embodiment, a controlled atmosphere can be a second controlled atmosphere wherein the atmosphere is a controlled oxygen atmosphere, generally higher in oxygen concentration than the first controlled atmosphere. In one embodiment, the concentration of oxygen in the second controlled atmosphere is greater than about 1 mol % of the total gas content. In a further embodiment, the concentration of oxygen in the second controlled atmosphere is greater than about 5 mol %. In a further embodiment, the concentration of oxygen in the second controlled atmosphere is greater than about 10 mol %. In an exemplary embodiment, the second controlled atmosphere is air. An oxygen rich atmosphere can also be used as the second controlled atmosphere in some embodiments. An upper limit on oxygen content may be set by practical processing concerns, such as cost or health and safety issues, which may vary from case to case but are well understood by one of ordinary skill in the art.

Figure 2:
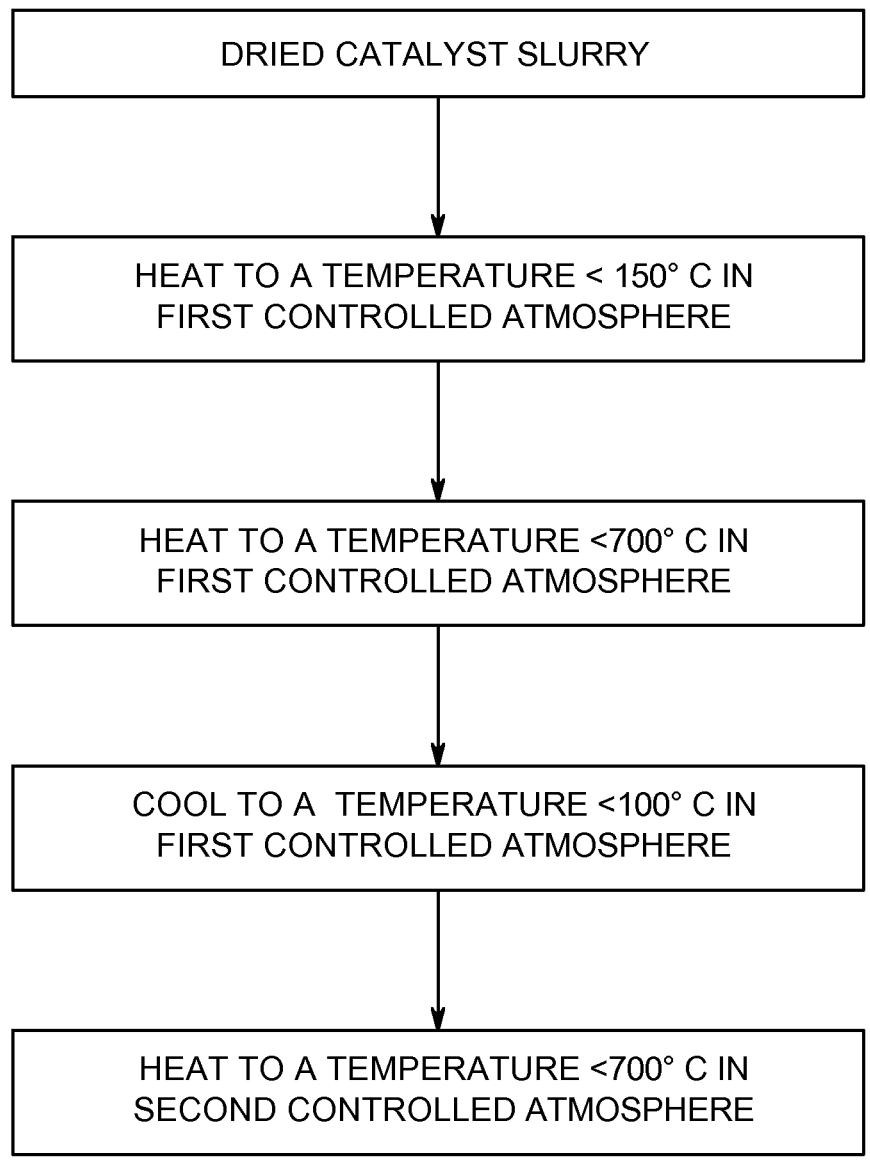
FIG. 2 is a process map of pyrolyzing raw catalyst powder in an inert atmosphere followed by oxidation in accordance with one embodiment of the invention.
Figure 3:
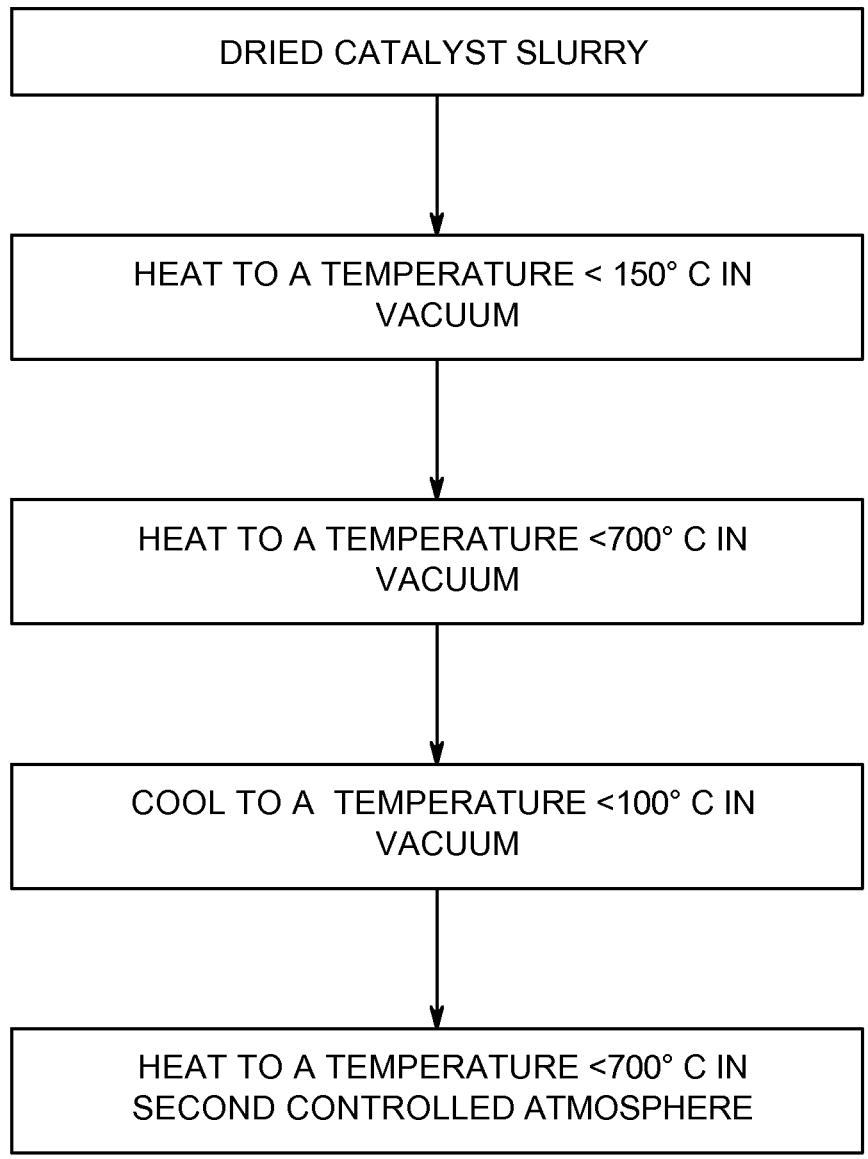
FIG. 3 is a process map of pyrolyzing raw catalyst powder in vacuum followed by oxidation in accordance with one embodiment of the invention.

Typically, de-tritonization comprises at least two steps of temperature treatment in the first controlled atmosphere. The first step of heat treatment is a dehydration step at a temperature lower than about 150° C. and typically results in a dehydrated catalyst powder, while the second step of temperature treatment typically results in a pyrolyzed catalyst powder. The de-tritonized and pyrolyzed powders can then be calcined at a calcining temperature with the exposure to the second controlled atmosphere. The de-tritonization can be achieved in one of two different ways. FIG. 2 and FIG. 3 detail the process steps of the two ways of pyrolyzing the dried catalyst powders.

The temperature of the dried catalyst powder can be slowly increased in the first atmosphere up to about 150° C. as illustrated in FIG. 2, in order to remove water. In one embodiment, the first atmosphere used for de-tritonization is nitrogen. In another embodiment, the first atmosphere can be of argon. Typically, this increase, or "ramp," can occur very slowly and can include one or more "soak points" (points in the process where the temperature is temporarily held constant) as determined for the property enhancement of the final catalyst powder. The time required for the ramp and soak varies with the geometry of the powder and mass transfer of the TRITON X-114 through the bulk of the powder. The temperature of the powder can be further increased and then held at temperatures less than 700° C. for a time adequate to pyrolize any hydrocarbons. In one embodiment, this hold temperature is less than 600° C. In a further embodiment, the hold temperature is about 550° C. This heat treatment results in a carbon-containing silver-templated mesoporous alumina (Ag-TA) powder referred to herein as pyrolyzed catalyst powder.

In another embodiment, the process can be performed under vacuum as illustrated in FIG. 3. In this embodiment, the powder temperature is increased from room temperature to a temperature less than about 700° C. at a steady state. In one embodiment, the temperature is increased in vacuum up to about 500° C. at a rate of 1° C./min. This treatment of dried catalyst powder also results in pyrolyzed catalyst powder.

The resultant pyrolyzed catalyst powder is then cooled down to a temperature sufficient to inhibit carbon oxidation. In one embodiment, this temperature is below 100° C. In a further embodiment, the cooled powder is at a temperature of about room temperature. In the cooled state, the pyrolyzed catalyst powders can be exposed to the second controlled atmosphere. In one embodiment, the second controlled atmosphere has an oxygen concentration greater than about 5 mol %. The temperature of the pyrolyzed catalyst powder can then be increased in the second controlled atmosphere to a temperature greater than about 500° C. In one embodiment, the temperature used for pyrolyzing is less than about 700° C. In one embodiment, this temperature is less than about 600° C. In one embodiment, this temperature is about 550° C. In one embodiment, once the powder has reached a desired calcination temperature, a gradual switch over to an atmosphere of air can be introduced.

The powder can be held at the calcination temperature for a time adequate to oxidize all or substantially all of the carbon on the powder. This time will be dependant on the catalyst bed thickness and the oxygen mass transfer rate. A fluidized bed will typically oxidize faster than a stagnant bed. In some embodiments, the calcination is conducted for up to about 48 hours, and generally longer than about 10 minutes. Other suitable time ranges, again depending on the selected temperature, reactor bed design, and other variables, include any of the following: from about 10 minutes to about 30 minutes, from about 30 minutes to about 1 hour, from about 1 hour to about 10 hours, from about 10 hours to about 24 hours, and from about 24 hours to about 48 hours. Once the carbon has been oxidized, the powder can be cooled, and the resulting material is referred to herein as calcined catalyst powder or alternately "catalyst powder". In one embodiment, the catalyst powder is Ag-TA.

The process steps described in the above paragraphs allow the preparation of a large quantity of catalyst powders. In one embodiment, the catalyst powder that can be prepared using the above described process is more than 5 kg/batch. In another embodiment, more than about 10 kg per batch of catalyst powders can be prepared. In a further embodiment, a single batch can prepare more than about 50 kg of catalyst powder.

The desired properties of the catalyst powder include, among others, particle size, morphology, activity, and porosity of the catalyst. The powder includes particles having a median diameter that is less than about 100 micrometers. In some embodiments, the catalyst powder particles have a median less than about 50 micrometers; in certain embodiments, the median is less than about 25 micrometers. In one embodiment, the catalyst powder has particles with a median in the range of about 10 to about 25 micrometers. In one specific embodiment, the median is in the range from about 1-10 micrometers. In yet another embodiment, the median is less than about 1 micrometer.

The catalyst powder may have a surface area greater than about 100 m$^2$/gram. In one embodiment, the surface area of the calcined catalyst powder is greater than about 200 m$^2$/gram. In one embodiment, the surface area is in a range of from about 200 m$^2$/gram to about 500 m$^2$/gram. In some embodiments, the surface area is in the range of about 300 m$^2$/gram to about 600 m$^2$/gram. In one exemplary embodiment, the catalyst powder has a surface area that is in a range from about 300 m$^2$/gram to about 500 m$^2$/gram.

The catalyst powder may have periodically arranged templated pores of determined dimensions. The dimensions can include pore diameter, degree of curvature, uniformity of the inner surface, and the like. The median diameter of the pores, in some embodiments, is greater than about 2 nm. The median diameter of the pores, in one embodiment, is less than about 100 nm. In some embodiments, the median diameter of the pores is in a range from about 2 nm to about 20 nm. In another embodiment, the diameter is from about 20 nm to about 60 nm and in yet another embodiment, the diameter is from about 60 nm to about 100 nm. The pores in some embodiments have a periodicity greater than about 50 Å. The pores in some embodiments have a periodicity less than about 150 Å. In one embodiment, the pores have a periodicity in the range of from about 50 Å to about 100 Å. In another embodiment, the pores have a periodicity in the range from about 100 Å to about 150 Å.

In one embodiment, the catalyst powder can be included in fabricating a catalytic surface. In one embodiment, the catalyst powder can be shaped and formed as a catalyst surface. In another embodiment, a slurry of the catalyst powder in a liquid medium can be formed and contacted with a catalyst support to form a catalytic converter.

A catalyst support can be in any form including foams, monoliths, and honeycombs. Suitable materials for the catalyst support include ceramics and metals. Examples of ceramics include oxides, such as alumina, silica, titanate compounds, as well as refractory oxides, cordierite, mullite, and zeolite. Other examples include metal carbides and metal nitrides. Carbon may be useful in some embodiments. In specific embodiments, the catalyst support includes silicon carbide, fused silica, activated carbon, or aluminum titanate. Zeolite, as used herein, includes hydrated aluminosilicates, such as analcime, chabazite, heulandite, natrolite, phillipsite, and stilbite. Mullite, as used herein, is a form of aluminium silicate. In another exemplary embodiment, the suitable catalyst support includes metal corrugated forms.

In one embodiment, the slurry of the catalyst powder is washcoated onto a catalyst support such as a monolith. In one embodiment of the invention, the catalyst support is a monolith including cordierite. The applied washcoat may be dried, sintered and used to reduce an emission content such as NOx.

In one embodiment, a method of using the said catalyst composition includes introducing a gas stream in a chamber having a composition comprising a templated metal oxide substrate having a plurality of pores and a catalyst material comprising silver. The silver may be present in an amount of at least about 0.5 wt % based on a total weight of the substrate. In one embodiment, the silver is present in an amount greater than 3 wt % based on a total weight of the substrate. In one embodiment, the amount of silver present is about 6 wt % of the catalyst substrate. The nitrogen oxide present in the gas stream may be reduced at a temperature of about 250° C. or greater. In one embodiment, the reduction occurs at a temperature range of about 250° C. to about 350° C. In another embodiment, the temperature is in the range of about 350° C. to about 500° C. In another specific embodiment the temperature is in the range of about 500° C. to about 600° C. In one exemplary embodiment, the nitrogen oxide present in the gas stream may be reduced at a temperature of less than about 350° C. in the chamber.

EXAMPLE

The following example illustrates exemplary details incorporated in the preparation, drying, pyrolization, and calcination of Ag-TA catalyst powder, in accordance with different embodiments of the invention.

Lab-Scale Synthesis

An exemplary process for forming templated metal oxide with silver includes the following. A 5-liter, 3-necked flask equipped with a mechanical stirrer, a reflux condenser, and an addition funnel was charged with TRITON X114 (68.7 g, 0.16 mol) and ethylacetoacetate (13.2 g, 0.1 mol) in 250 mL of 2-propanol. An amount of Al(O$^{sec}$Bu)$_3$ (249.8 g, 1.02 mol) dissolved or suspended in 1-liter of 2-propanol was added to the flask. The contents were stirred for 30 minutes. An amount of silver nitrate (AgNO$_3$) was dissolved in water (37 mL, 2.06 mol). The silver nitrate solution was used as noted below. The amount of AgNO$_3$ (5.383 g, 0.0317 mol) for catalyst product 1, results in 6 percent silver templated alumina catalyst composition and the amount of AgNO$_3$ (2.6 g, 0.0158 mol) for catalyst product 2, results in 3 percent silver templated alumina catalyst composition. The silver nitrate solution was combined with 500 mL of 2-propanol and was charged to an addition funnel. The contents of the addition funnel were added to a 5-liter flask over the course of 75 minutes. The stirred solution was refluxed for 24 hours.

After cooling, the contents were filtered and washed with about 250 mL of ethanol to obtain a semi-dried mass. The semi-dried mass was extracted with ethanol in a soxhlet apparatus for 24 hours. The ethanol extraction was used to remove organic residue in the semi dried mass. In a typical ethanol extraction procedure, a dried powder was added to a soxhlet extraction thimble and the thimble was placed in a soxhlet extraction apparatus on top of a flask charged with ethanol. The ethanol was heated to reflux. The extraction involves ethanol flush through the solid, removing ethanol-soluble organics including residual TRITON X114 and ethylacetoacetate. The obtained product was oven-vacuum dried at 30 mmHg for 24 hours to obtain a solid. The obtained brown solid was condensed, pyrolyzed under nitrogen in a tube furnace to 550° C. at a heating rate of 2° C./min to obtain a reaction product, maintained at 550° C. for 1 hr, cooled to room temperature and calcined in a flow of air at 550° C. for 5 hours to get catalyst products 1 and 2.

Large-Scale Synthesis

A glass-lined steel reactor of 100-Gallon capacity equipped with circulating hot oil heat, retreating curve agitator, baffle with thermocouple probe, nitrogen sweep, and reflux/distillation condenser with a nitrogen blanket was used for this experiment. The reactor was charged with about 60.5 kg of ethylacetoacetate (130 g/mol) and about 2.6 kg of TRITON-X114 (426 g/mol) while stirring at 95 RPM under the nitrogen blanket. About 15 kg of aluminum sec-butoxide (246 g/mol) was added to the reactor under continuous stirring.

The contents of the reactor were stirred for about 30-45 minutes. A silver nitrate solution prepared by dissolving about 0.331 kg of silver nitrate (170 g/mol) in about 2.2 kg of DI water along with about 20.5 kg of IPA was homogenized in a separate container and slowly added to the reactor using a peristaltic pump to get a product 3 with about 6 mol % silver based on theoretical moles of alumina.

During the transfer of the homogenized silver/water/IPA solution to the reactor, the reaction mixture slowly became cloudy and thicker. The reaction mixture was stirred for 3 hours at ~30° C. and then hot oil heat was applied to gently reflux the mixture for 24 hours (~80° C.). The reactor contents were cooled slightly and about 75 kg of DI water was added to begin the solvent azeotrope distillation process. The agitator speed was increased to 115 RPM and a slight nitrogen sweep from the reactor vapor space through the condenser was initiated. The mixture was reheated to distill a water/IPA azeotrope to affect the removal of IPA and sec-butanol. The agitator speed was adjusted occasionally to minimize excessive splashing as the slurry level dropped during the swapping process. The distillate was collected in a tared drum. The removal of the azeotrope was continued with the occasional addition of about 4-12 kg of DI water until the absence of alcohol in the distillate was verified. The head temperature at this point was steady and at about 97° C. The brown slurry was cooled to room temperature and drained into a tared 55 gallon polyethylene drum. The drum was placed on a drum roller and rolled for over 2 hours prior to further processing.

Before the spray drying trial began, a lab-scale drying test was conducted in an oven to determine the processing outlet temperature. The temperature and appearance were recorded over time. The initial drying temperature was selected based on prior experiments with drying solvent-based feed materials. The drying test showed that the processing inlet temperature ranged from about 250° C.-300° C. and outlet temperatures could range from 100° C.-180° C.

In a variation of the procedure in the above example, the alcoholic slurry was subjected to spray drying without the step of azeotropic distillation. The processing inlet temperature for that experiments ranged from about 110° C.-150° C. and outlet temperatures could range from 60° C.-100° C.

During spray drying runs, the drum was placed on a scale so that the weight of material pumped over time could be recorded. A total of 8 kg of material was collected after the spray drying step.

A product 4 with 3% silver loading was prepared using the process explained above using the required quantity of silver nitrate solution. Ethanol extraction can be introduced at different points of powder preparation before subjecting the powder to calcination. In the present set of examples, product 5 was formed by subjecting the spray dried powder of product 3 to ethanol extraction before calcination, product 6 was formed by subjecting the spray dried powder of product 4 to ethanol extraction before calcination, and product 7 was formed by subjecting the synthesized powder of product 4 to ethanol extraction before spray drying and calcination.

In one experiment, the dried powder of product 3 was divided into two batches and heat-treated separately. A first part was heat treated in a vacuum oven at a vacuum level of about 0.2 torr. The temperature was raised to about 520° C. with a rate of about 1° C./minute and held for about two hours. The pyrolyzed powders were cooled to room temperature at a rate of about 5° C./minute resulting in a charcoal black powder. These powders were then calcined in air by heat-treating the powders at a rate of about 5° C./minute to a temperature of about 600° C. Upon being cooled to room temperature, a white powder of the calcined catalyst powder was obtained.

Figure 4:
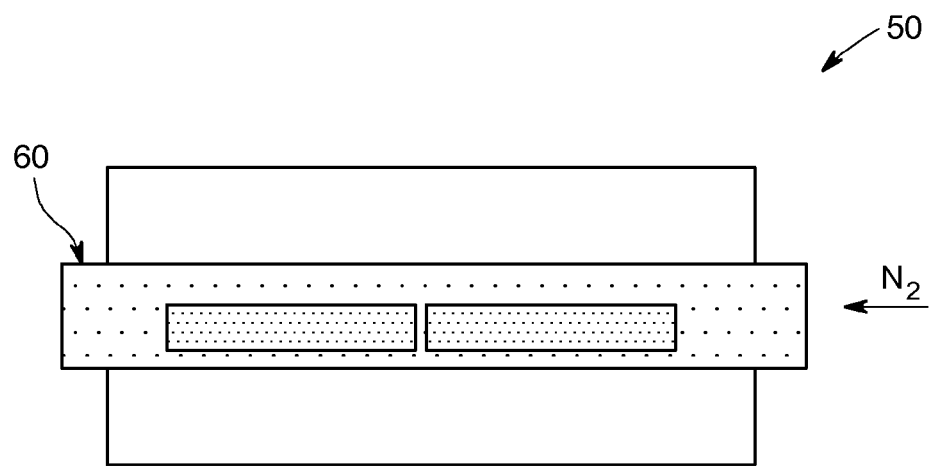
FIG. 4 is a conceptual view of a rotary furnace used for pyrolysis and calcination processes, in accordance with one embodiment of the invention.

A second part of the dried powder was subjected to pyrolysis in a tube furnace 50 shown in FIG. 4. The powders were heat-treated in a nitrogen atmosphere inside a heating tube 60. The powders were heated at a rate of about 3° C./min and dehydrated at a temperature of about 150° C. by holding at constant temperature for an hour. The temperature of the powders inside the tube furnace was raised to about 550° C. in a nitrogen atmosphere at a rate of about 3° C./minute. The powders were cooled down to below 100° C. and the atmosphere was changed to about 9% oxygen. The powders in the 5% oxygen atmosphere were calcined by heating to about 600° C. The atmosphere was changed to air and cooled to room temperature. A white powder of the calcined catalyst powder was obtained.

Samples of the material were collected after the thermal treatment was completed. At the end of each run, the material was taken out of the collector, weighed and placed in a sealed bag. The calcined catalyst powders were measured to have a $D_{90}$ of about 4.3 micrometers and BET surface area of about 293 $m^2/g$ for the samples collected from product 3.

Figure 5:
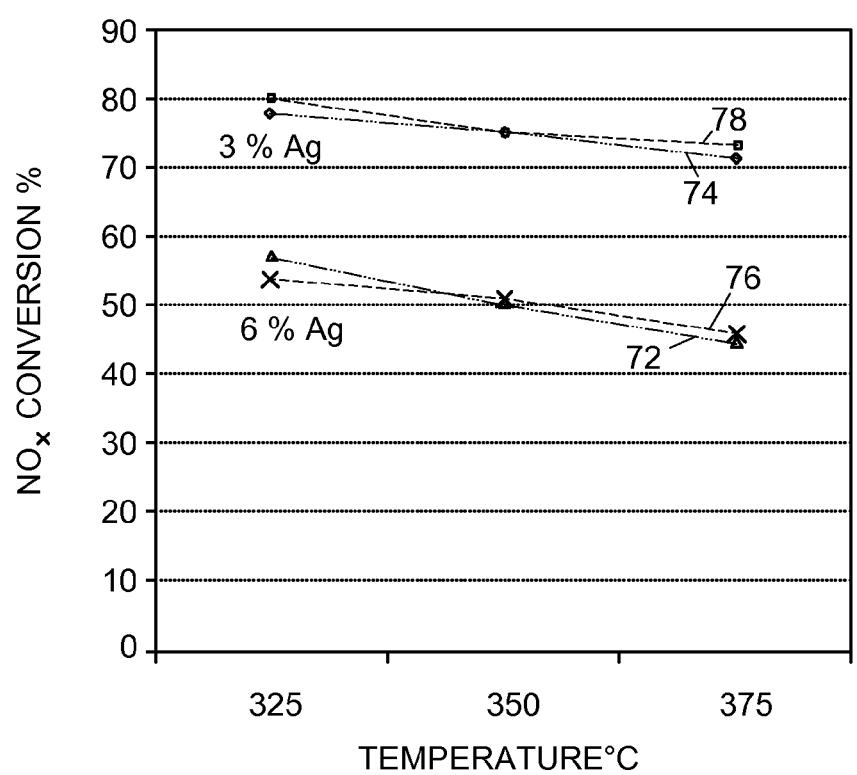
FIG. 5 is a graph comparing NOx conversion activities of 3% and 6% silver added calcined catalyst powders prepared at a large-scale batch versus a lab-scale batch in accordance with one example of the invention.

FIG. 5 compares the NOx conversion activity for the powders of products 1, 2, 5, and 6 at a temperature range of 325° C. to about 375° C. range. Both at 3% silver addition and 6% silver addition, the lab-scale NOx conversion activity curves 72, 74 are similar to the large-scale NOx conversion activity curves 76, 78 respectively at the measured temperature ranges. This demonstrates the applicability of the synthesis and process variations adapted for the large-scale batch without substantially reducing the desired NOx conversion activities of the calcined powders in comparison with the lab-scale batches. Comparison of the NOx activity curves of the 6% silver added catalyst powders of the lab-scale 72 (product 1) and large-scale 76 (product 5) with that of the 3% silver added catalyst powder of the lab-scale 74 (product 2) and large-scale 78 (product 6) shows that the 3% silver catalyst had a better NOx activity at the measured temperature ranges than the 6% silver added catalyst powders.

Figure 6:
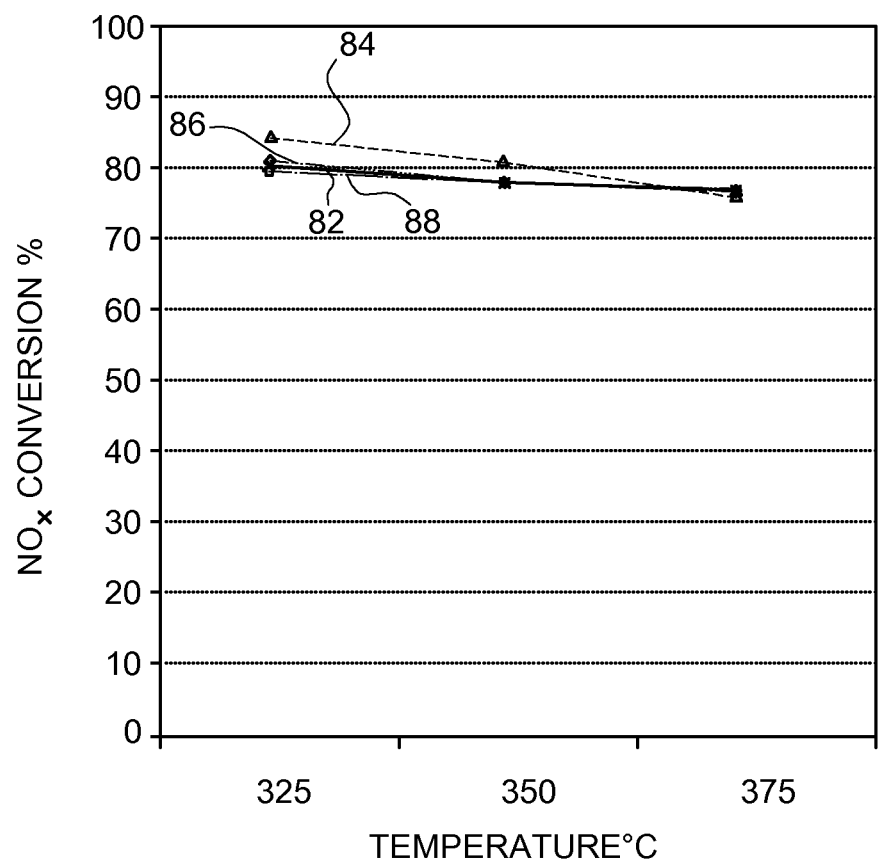
FIG. 6 is a graph comparing NOx conversion activities of 3% silver added calcined catalyst powders prepared with and without subjecting the powders to ethanol extraction in accordance with one example of the invention.

FIG. 6 compares the NOx conversion activities for the powders of products 2, 4, 7, and 6 at a temperature range of 325° C. to about 375° C. range. The figure shows that the NOx conversion activity curve 84 (product 4) of the large-scale batch without ethanol extraction had a higher starting point at a temperature of 325° C. and the NOx conversion activity reduced as the temperature of measurement increased. The NOx conversion activity curves 82, 86, 88 of the products (2, 7, 6) subjected to the ethanol extraction at different points during preparation or processing had more stable NOx conversion activities across the temperature range measured in this experiment, regardless of the batch size of the synthesis and processing.

A larger batch than the large-scale synthesis described in the above examples was also produced by following similar procedures as described in the above examples to form a product 8. Product 8 was made by increasing the batch size of the product 3 by about 20%; which resulted in calcined powders of about 10 kg without substantial difference in the particle size and BET surface area compared to product 3.

Experiments were also carried out by varying the pyrolysis and calcination conditions. For example, the rate of heating and the highest temperature of heat treatments were varied for the pyrolysis and calcination conditions and compared to document the effect of these variations.

Figure 7:
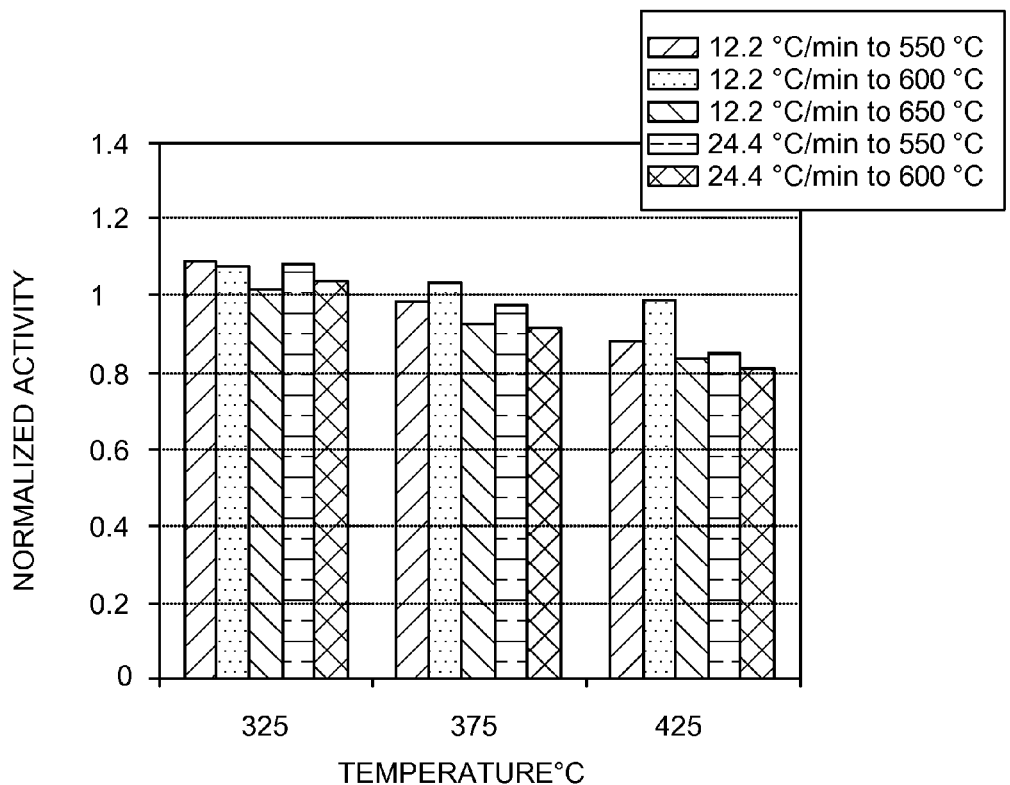
FIG. 7 is a graph comparing NOx conversion activities of calcined catalyst powders subjected to different heating conditions during pyrolysis in accordance with one example of the invention.

FIG. 7 shows a comparison of the normalized NOx conversion activities of a calcined catalyst powder product prepared in a large-scale batch and pyrolyzed at different heating conditions drawn versus the temperature of measurement. The bars in the FIG. 7 compare the powders pyrolyzed at temperatures 550° C., 600° C., and 650° C. and the powders pyrolyzed at different heating rates such as 12.2° C./min and 24.4° C./min. The normalized NOx conversion activity shows that while a general small reduction was observed as the temperature of measurement increases, no significant changes were observed for the powders subjected to different heating conditions during pyrolysis.

Figure 8:
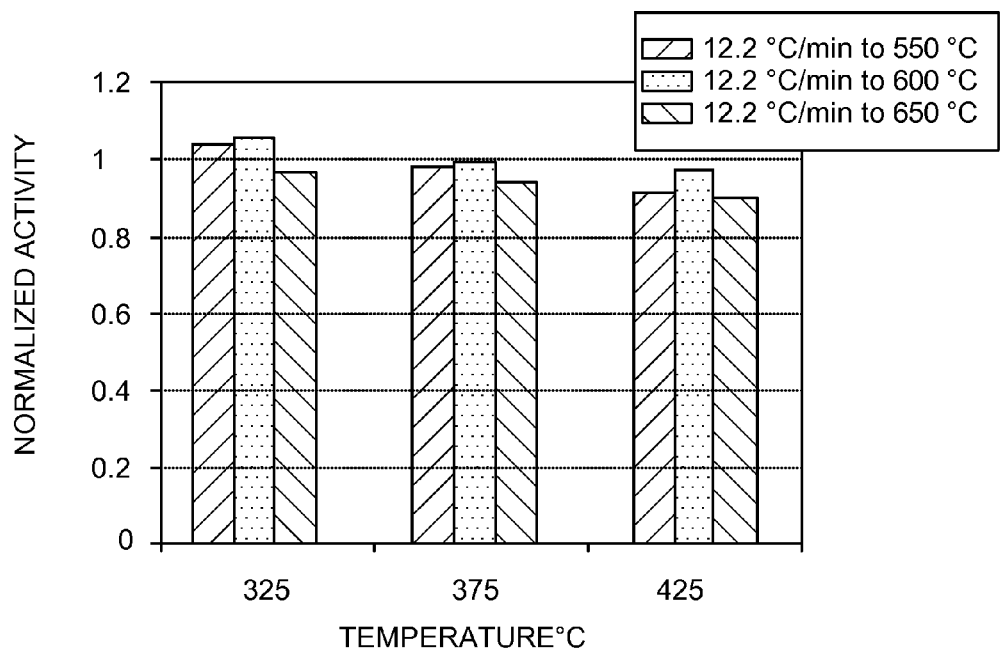
FIG. 8 is a graph comparing NOx conversion activities of calcined catalyst powders subjected to different heating conditions during calcination in accordance with one example of the invention.

FIG. 8 shows a comparison of the normalized NOx conversion activities of a calcined catalyst powder product prepared in a large-scale batch and calcined at different heating temperatures drawn versus the temperature of measurement. The bars in the FIG. 8 compare the powders calcined at temperatures 550° C., 600° C., and 650° C. at a heating rate of 12.2° C./min. Similar to the observation above about the catalyst powders pyrolyzed at different heating conditions, the normalized NOx conversion activity of FIG. 8 shows that while a general small reduction was observed as the temperature of measurement increases, no significant changes were observed for the powders subjected to different heating conditions during calcination.

The embodiments described herein are examples of methods having elements corresponding to the elements of the invention recited in the claims. This written description may enable those of ordinary skill in the art to make and use embodiments having alternative elements that likewise correspond to the elements of the invention recited in the claims. The scope of the invention thus includes methods that do not differ from the literal language of the claims, and further includes other articles, systems and methods with insubstantial differences from the literal language of the claims. While only certain features and embodiments have been illustrated and described herein, many modifications and changes may occur to one of ordinary skill in the relevant art. The appended claims cover all such modifications and changes.

The invention claimed is:

1. A process for producing a catalyst powder, comprising:
   preparing a catalyst slurry comprising a catalyst, a liquid carrier, a templating agent, and a catalyst substrate;
   drying the catalyst slurry to obtain a raw catalyst powder;
   heating the raw catalyst powder in a first controlled atmosphere to get a pyrolyzed catalyst powder; and
   calcining the pyrolyzed catalyst powder in a second controlled atmosphere to get a calcined catalyst powder.

2. The process of claim 1, wherein the first controlled atmosphere is an inert atmosphere.

3. The process of claim 2, wherein the heating comprises a first step and a second step.

4. The process of claim 3, wherein the first step is a dehydration step at a temperature lower than about 150° C.

5. The process of claim 3, wherein the second step is a pyrolyzing step at a temperature lower than about 700° C.

6. The process of claim 1, wherein the first controlled atmosphere is vacuum.

7. The process of claim 1, wherein the second controlled atmosphere comprises oxygen, and wherein the oxygen concentration is greater than about 1 mol % of the total gas content of the second controlled atmosphere.

8. The process of claim 7, wherein the oxygen concentration is greater than about 5 mol %.

9. The process of claim 7, wherein the second controlled atmosphere is air.

10. The process of claim 7, wherein calcining comprises exposing the pyrolyzed catalyst powder to the second controlled atmosphere at a temperature lower than about 100° C.

11. The process of claim 1, wherein the catalyst comprises silver.

12. The process of claim 1, wherein the catalyst substrate comprises mesoporous alumina.

13. The process of claim 1, wherein the liquid carrier comprises alcohol.

14. The process of claim 13, wherein the alcohol comprises isopropanol.

15. The process of claim 1, wherein a median particle size of the calcined catalyst powder produced is lower than about 10 microns.

16. The process of claim 1, wherein a median batch size of the prepared calcined catalyst powder is greater than about 5 kg.

17. The process of claim 1, further comprising adding water to the catalyst slurry.

18. The process of claim 17, further comprising exchanging alcohol with water before spray drying.

19. The process of claim 1, wherein the calcined catalyst powder has a specific surface area greater than about 200 $m^2/g$.

20. A process for producing a catalytic convertor, comprising:
    preparing a catalyst slurry comprising a catalyst, a liquid carrier, a templating agent, and a catalyst substrate;
    drying the catalyst slurry to obtain a raw catalyst powder;
    heating the raw catalyst powder in a first controlled atmosphere to get a pyrolyzed catalyst powder;
    calcining the pyrolyzed catalyst powder in a second controlled atmosphere to get a calcined catalyst powder; and
    fabricating a catalytic surface comprising the calcined catalyst powder.

21. The process of claim 20, wherein fabricating the catalytic surface comprises disposing a calcined catalyst powder slurry on a catalyst support.

22. The process of claim 21, wherein disposing the calcined catalyst powder slurry on the catalyst support comprises wash coating.

23. The process of claim 21, wherein the catalyst support comprises a porous monolith.

24. A process for producing a NOx catalytic convertor, comprising:
    preparing a catalyst slurry comprising silver, alumina, an alcohol, and a templating agent;
    spray drying the catalyst slurry to get a raw catalyst powder;
    heating the raw catalyst powder in an inert atmosphere to get a pyrolyzed catalyst powder;
    calcining the pyrolyzed catalyst powder in a controlled oxygen atmosphere to get a calcined catalyst powder comprising silver templated mesoporous alumina (Ag-TA);
    mixing the calcined catalyst powder with a liquid to form a calcined catalyst powder slurry; and
    washcoating the calcined catalyst powder slurry onto a monolith support.

* * * * *

UNITED STATES PATENT AND TRADEMARK OFFICE
CERTIFICATE OF CORRECTION

PATENT NO. : 8,476,187 B2  
APPLICATION NO. : 12/652808  
DATED : July 2, 2013  
INVENTOR(S) : Norton et al.

Page 1 of 1

It is certified that error appears in the above-identified patent and that said Letters Patent is hereby corrected as shown below:

In the Specification:

In Column 5, Line 8, delete "14" and insert -- ≤14 --, therefor.

In Column 9, Line 1, delete "stiffing" and insert -- stirring --, therefor.

Signed and Sealed this  
Third Day of September, 2013

Teresa Stanek Rea  
*Acting Director of the United States Patent and Trademark Office*